(12) United States Patent
Floyd (10) Patent No.: US 8,622,460 B2
(45) Date of Patent: Jan. 7, 2014

(54) RECREATIONAL CAMPER WIND RESTRAINT SYSTEM AND METHOD (75) Inventor: Gerald R Floyd, Colleyville, TX (US)

(73) Assignee: A Frame Wind Kits LLC, Bedford, TX (US)

( * ) Notice: Subject to any disclaimer, the term of this patent is extended or adjusted under 35 U.S.C. 154(b) by 46 days.

(21) Appl. No.: 13/342,822

(22) Filed: Jan. 3, 2012

(65) Prior Publication Data
US 2013/0167889 A1 Jul. 4, 2013

(51) Int. Cl.
B60P 3/39 (2006.01)

(52) U.S. Cl.
USPC .......................................................... 296/172

(58) Field of Classification Search
USPC .............. 296/172, 162, 163, 171, 219, 26.01, 296/156, 160, 165, 173; 135/88.12, 88.01, 135/88.1, 88.13; 160/67; 297/256.13; 280/166
See application file for complete search history.

(56) References Cited

U.S. PATENT DOCUMENTS

| 3,617,086 | A | * | 11/1971 | King et al. | 296/172 |
| 3,648,946 | A | * | 3/1972 | Stoffel | 242/382.3 |
| 3,692,253 | A | * | 9/1972 | Curran | 242/381.4 |
| 3,814,346 | A | * | 6/1974 | Carter | 242/381.1 |
| 3,862,526 | A | * | 1/1975 | Loughlin | 52/70 |
| 4,347,992 | A | * | 9/1982 | Imai | 242/598 |
| 4,548,438 | A | * | 10/1985 | Myers | 296/160 |
| 4,729,523 | A | * | 3/1988 | Saitou et al. | 242/383.1 |
| 4,732,346 | A | * | 3/1988 | Tamura et al. | 242/383.1 |
| 4,749,142 | A | * | 6/1988 | Saitow | 242/382.2 |
| 4,807,924 | A | * | 2/1989 | Kottke | 296/164 |
| 5,370,333 | A | * | 12/1994 | Lortz et al. | 242/384.1 |
| 5,375,902 | A | * | 12/1994 | Church | 296/169 |
| RE38,766 | E | * | 8/2005 | Karlsson | 296/161 |
| 7,201,431 | B1 | * | 4/2007 | Calandruccio | 296/173 |
| 7,357,440 | B1 | * | 4/2008 | Calandruccio | 296/156 |
| 2006/0113823 | A1 | * | 6/2006 | Hanson | 296/172 |
| 2012/0175909 | A1 | * | 7/2012 | Frerichs | 296/170 |

* cited by examiner

Primary Examiner — Kiran B Patel
(74) Attorney, Agent, or Firm — Karl L. Larson (57) ABSTRACT A recreational camper wind restraint system and method that includes a housing connected to a portion of a recreational camper, a recreational camper having a movable portion, the movable portion having a compacted position and an expanded position, a retractable belt having a first end rotatably contained within the housing and a second end operatively connected to the moveable portion, a winding means contained within the housing for operatively winding and unwinding the retractable belt longitudinally within a predetermined range of movement defined substantially by the compacted position and the expanded position of the moveable portion, and an energy-absorbing element adapted to cooperate with the retractable belt to absorb energy and temporarily lock the retractable belt in a fixed position when a predetermined force is exceeded by a wind condition.

9 Claims, 6 Drawing Sheets

RECREATIONAL CAMPER WIND RESTRAINT SYSTEM AND METHOD

BACKGROUND OF THE INVENTION

1. Field of the Invention

The present invention is generally related to recreational apparatus, and more particularly to a recreational camper wind restraint system and method.

2. Discussion of the Background

Many types of recreational apparatuses such as certain types of recreational campers, vehicles or trailers are susceptible to weather elements during setup. One such recreational camper, vehicle or trailer is an A-frame type recreational vehicle. An A-frame type recreational vehicle, also known as an A-frame camper, is a folding tent trailer and is typically associated with camping and other recreational uses. A-frame campers are also commercially known, without limitation, under the names "Aliner," "A'Van," "Chalet" and "Forest River." An A-frame has an A-frame roof which is collapsible during transportation. During setup, the A-frame roof is unlocked and the A-frame roof is extended and locked into place. The A-frame roof is susceptible to wind or other weather elements until the roof is locked into place or otherwise secured. A sudden or unexpected wind gust while the A-frame roof is being raised could damage or at least delay the setup of the A-frame. Other types of camping or recreational apparatuses also suffer from similar deficiencies relating to sudden or unexpected movements.

Thus, there currently exist deficiencies associated with recreational apparatuses, and, in particular, with restraining such apparatuses from sudden or unexpected movements caused by weather conditions.

SUMMARY OF THE INVENTION

Accordingly, one aspect of the present invention is to provide a recreational camper wind restraint system that includes a housing, a recreational camper having a movable portion, a retractable belt having a first end rotatably contained within the housing and a second end operatively connected to the moveable portion, a winding means contained within the housing for operatively winding and unwinding the retractable belt longitudinally within a predetermined range of movement defined substantially by a compacted position and an expanded position of the moveable portion, and an energy-absorbing element adapted to cooperate with the retractable belt to absorb energy and temporarily lock the retractable belt in a fixed position when a predetermined force is exceeded by a wind condition. The housing is connected to a portion of a recreational camper. The movable portion has a compacted position and an expanded position. The position of the movable portion may be affected by the force caused by the wind condition.

Another aspect of the present invention is to provide a recreational collapsible tent apparatus wind restraint system that includes a housing, a recreational collapsible tent apparatus having a movable portion, a retractable flexible member having a first end rotatably contained within the housing and a second end operatively connected to the moveable portion, a winding means contained within the housing for operatively winding and unwinding the retractable flexible member longitudinally within a predetermined range of movement defined substantially by a compacted position and an expanded position of the moveable portion, and a means for absorbing energy and temporarily locking the retractable flexible member in a fixed position when a predetermined force is exceeded by a wind condition. The housing is connected to a portion of a recreational collapsible tent apparatus. The movable portion has a compacted position and an expanded position. The position of the movable portion may be affected by a force caused by a wind condition.

Yet another aspect of the present invention is to provide a recreational camper wind restraint system method for securing a recreational camper against the wind. The method includes attaching a housing to a portion of a recreational camper having a movable portion, winding and unwinding from the housing a reeled retractable belt longitudinally within a predetermined range of movement, and temporarily locking the retractable belt in a fixed position when a predetermined force is exceeded by a wind condition via an energy-absorbing element adapted to cooperate with the retractable belt to absorb energy and temporarily lock the retractable belt in the fixed position. The movable portion has a compacted position and an expanded position. The position of the movable portion may be affected by a force caused by a wind condition. The retractable belt has a first end rotatably contained within the housing and a second end operatively connected to the moveable portion. The predetermined range of movement is defined substantially by the compacted position and the expanded position of the moveable portion.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein.

DETAILED DESCRIPTION OF THE PREFERRED EMBODIMENTS

Referring now to the drawings, wherein like reference numerals designate identical or corresponding parts throughout the several views, preferred embodiments of the present invention are described.

Many types of recreational apparatuses such as certain types of recreational campers, vehicles and trailers, collapsible tent structures and the like are susceptible to weather elements during setup. In fact, it is well known in the art that the first line of defense for a collapsible recreational camper is to fold the camper and seek shelter in a more stable structure. When a bad storm hits, regardless of the model of the recreational camper, a user is advised to not open or extend the recreational camper until the wind has died down to a safe level. Such actions could cause the recreational camper to fly apart if the wind is strong enough. Users of smaller, lighter recreational camper models are advised to fold them down early and, if possible, hook them up to a tow vehicle to anchor them. These smaller, lighter models may not have enough weight to hold them down in even moderate wind gusts.

One type of recreational apparatus that is susceptible to weather elements is an A-frame camper. An A-frame camper is a portable folding tent trailer and is typically associated with camping and other recreational uses. An A-frame has an A-frame roof which is collapsible during transportation. During setup, the A-frame roof is unlocked and the A-frame roof is raised and locked into place. The A-frame roof is susceptible to wind or other weather elements until the roof is locked into place or otherwise secured. A sudden or unexpected wind gust while the A-frame roof is being raised could damage or at least delay the setup of the A-frame camper.

Other types of camping or recreational apparatuses also suffer from similar deficiencies. Presently, there is no solution to the above-identified deficiencies.

Figure 1:
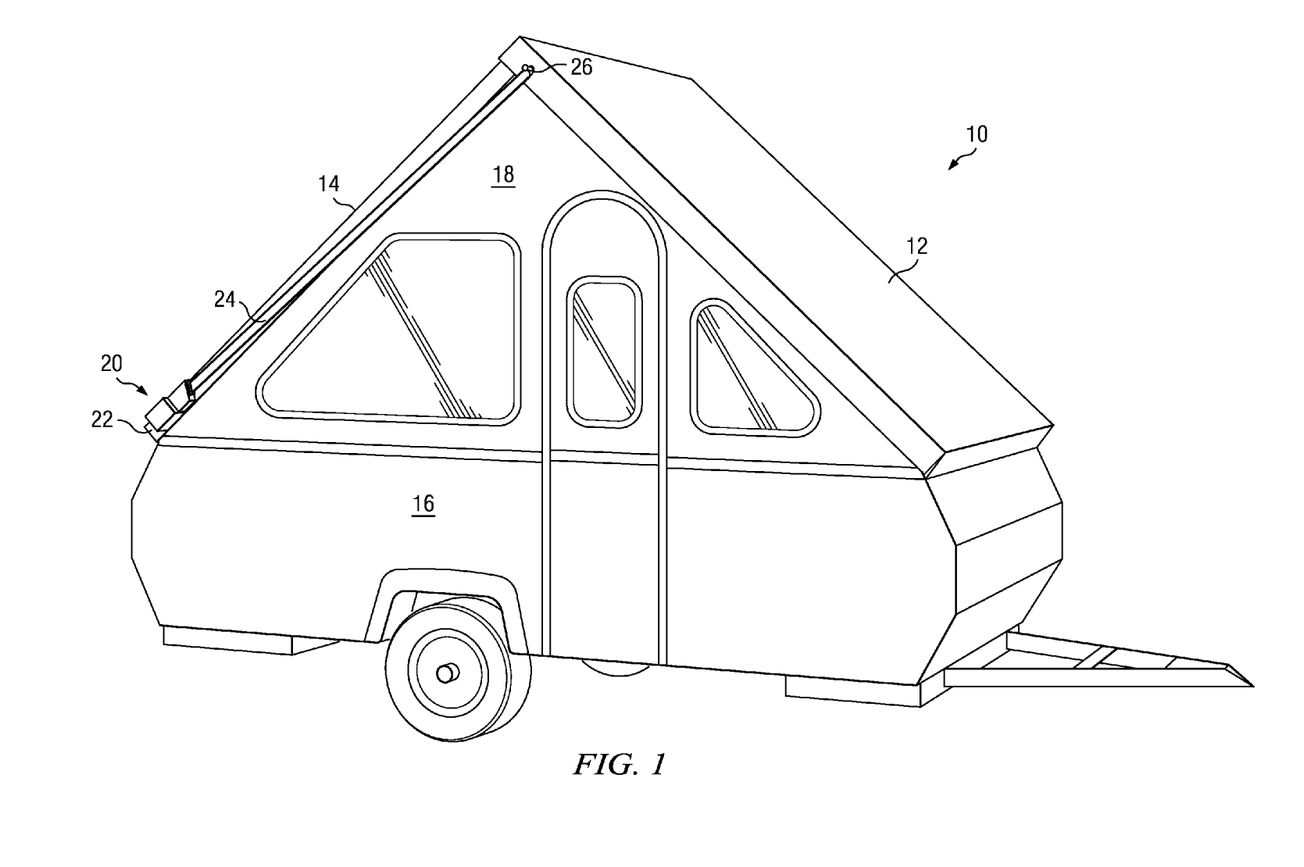
FIG. 1 shows a perspective view of an A-frame camper in an extended position with a restraining device in accordance with a first embodiment of the present invention.
Figure 2A:
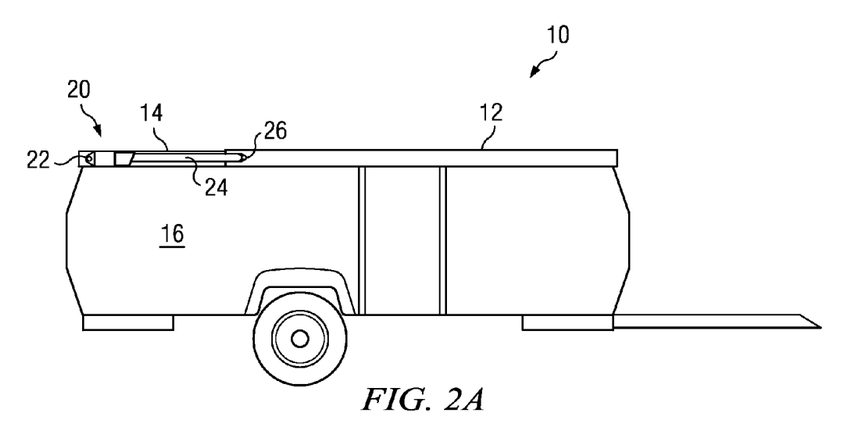
FIG. 2A shows a side view of the A-frame camper of FIG. 1 in a compacted position in accordance with the first embodiment of the present invention.
Figure 2B:
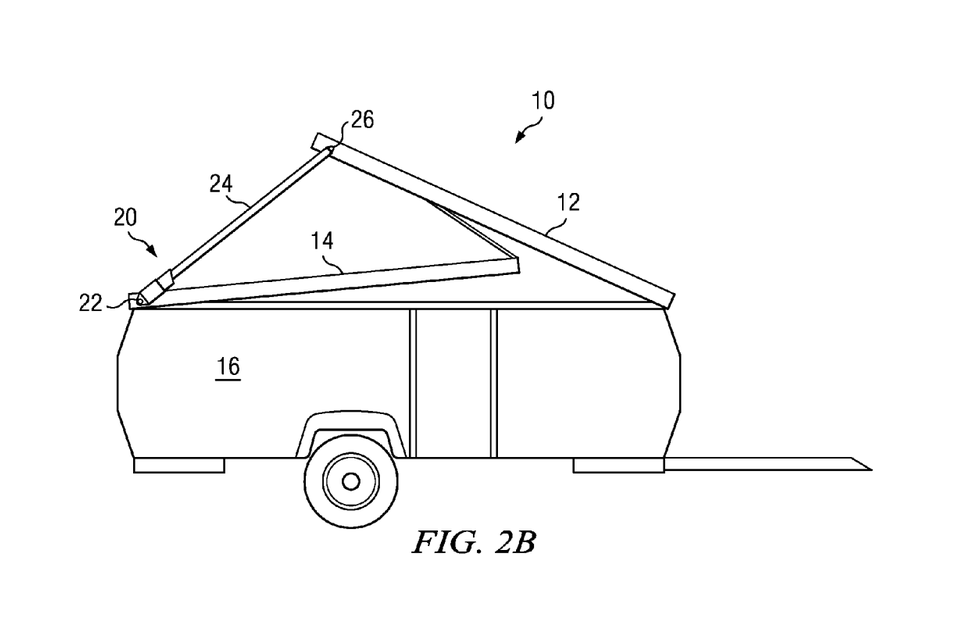
FIG. 2B show a side view of the A-frame camper of FIG. 1 in a partially expanded position in accordance with the first embodiment of the present invention.

Referring to FIG. 1, a perspective view of an A-frame camper 10 in an extended position with a restraining device 20 in accordance with an embodiment of the present invention is shown. A-frame camper 10 includes movable roof portions 12 and 14 which are arranged to cooperatively extend between an extended position, as shown in FIG. 1, and a collapsed position as shown in FIG. 2A. Movable roof portion 14 is interior to movable roof portion 12 in its collapsed position. A-frame camper 10 may also include a small rope or bungee cord which may be used to lift movable roof portion 14 as a spring lifts movable roof portion 12. A-frame camper 10 also includes sidewall 16 and a triangular foldable watt section 18. One or more restraining devices 20 are connected between portions of A-frame camper 10 that are susceptible to weather elements such that those portions are restrained from sudden or unexpected wind gusts. According to one possible embodiment, an exterior housing of the restraining device 20 is operationally connected to a lower side portion of movable roof portion 14. The exterior housing of the restraining device 20 may be fixedly or pivotally connected to A-frame camper 10, such as, without limitation, by means of a bolt, screw, nail, dowel, divot, hook, wire, cord, Velcro and the like, within the scope of the present invention. The exterior housing of the restraining device 20 may also be welded, glued or otherwise permanently connected to A-frame camper 10, or may be integrated into the A-frame camper 10 frame, such as, without limitation, movable roof portion 14, to form an interior housing rather than an exterior housing. Further, the exterior housing of the restraining device 20 may be connected to other portions of the A-frame camper 10 within the scope of the present invention. The exterior housing may be constructed of any now known or unknown material, such as, without limitation, metal, composite, plastic, glass, ceramic and the like.

Restraining device 20 includes a retractable belt 24. The first end, or proximal end, of the retractable belt 24 is fixedly contained within the housing in a belt spool 28. The second end, or distal end, of the retractable belt 24 is operatively connected to an upper side portion of movable roof portion 12 by means of attachment portion 26 at the distal end. The attachment portion 26 at the distal end of the retractable belt 24 may be fixedly or pivotally connected to A-frame camper 10, such as, without limitation, by means of a bolt, screw, nail, dowel, divot, hook, wire, cord, Velcro and the like, within the scope of the present invention. The attachment portion 26 may also be welded, glued or otherwise permanently connected to A-frame camper 10, or may be integrated into the A-frame camper 10 frame, such as, without limitation, movable roof portion 14. Further, the attachment portion 26 at the distal end may be connected to other portions of the A-frame camper 10 within the scope of the present invention.

Optionally, a second restraining device (not shown) is connected to a lower side portion of movable roof portion 14 and an upper side portion of movable roof portion 12 on an opposite parallel side to the restraining device 20 shown in FIG. 1.

Figure 3:
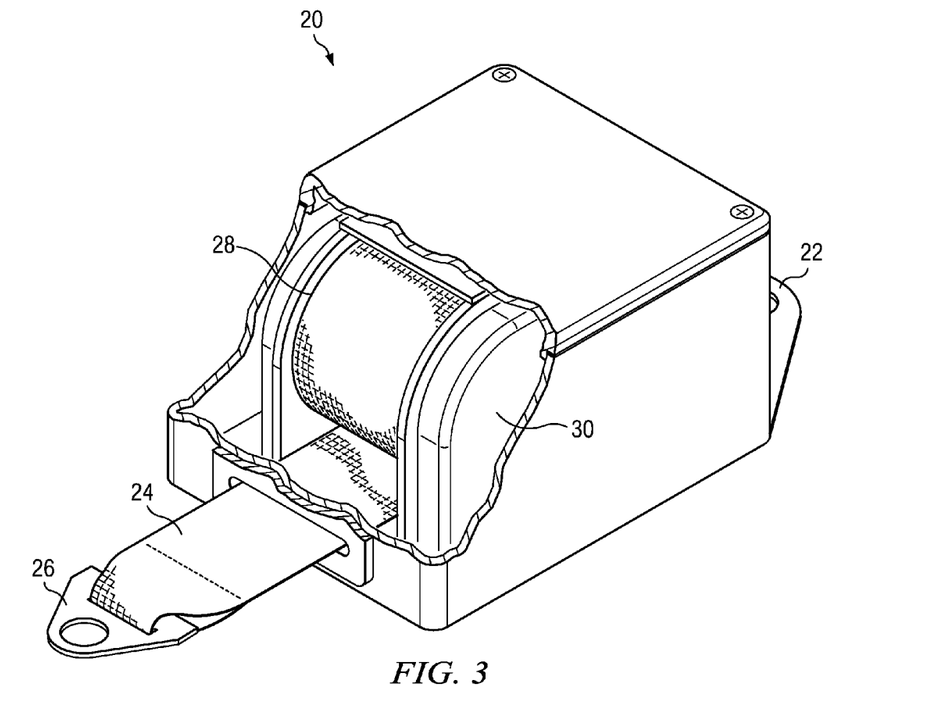
FIG. 3 shows an enlarged cut-away view of the restraining device with a retractable belt in accordance with the first embodiment of the present invention.

Referring to FIG. 3, an enlarged cut-away view of the restraining device 20 with a retractable belt 24 in accordance with an embodiment of the present invention is shown. As shown, restraining device 20 includes an exterior housing and a retractable belt 24 rolled into a spool 28 within housing 20 and extending longitudinally therefrom. A first end of the retractable belt 24 is fixedly contained within the housing 20. A second end, or distal end, of the retractable belt 24 extends longitudinally from an opening in the housing 20. The distal end of the retractable belt 24 includes attachment portion 26 that is configured to attach to a portion of the A-frame camper 10. The exterior housing of the restraining device 20 includes attachment portion 22. Attachment portion 22 may be configured, without limitation, as an exterior extending lip portion along a lower side or bottom portion of the exterior housing of the restraining device 20. Attachment portion 22 may also be arranged along other portions of exterior housing, such as, without limitation, the bottom or interior portions of the exterior housing and may include other configurations. Restraining device 20 includes an energy-absorbing portion 30 which may include energy-absorbing element 40 shown in FIGS. 5A and 5B. The energy-absorbing portion 30 is operatively connected to belt spool 28 and is adapted to cooperate with the retractable belt 24 to absorb energy and temporarily lock the retractable belt 24 in its current position upon the occurrence of a sudden or unexpected wind gust which results in a sudden centrifugal force retractable belt 24.

Attachment portions 22 and 26 may include any type of now known or unknown connector within the scope of the present invention. Attachment portions 22 and 26 may be configured to accommodate, without limitation, a bolt, screw, nail, dowel, divot, hook, wire, cord, Velcro and the like. Attachment portions 22 and 26 may also be configured to be welded, glued or otherwise permanently attached to the respective portions of A-frame camper 10.

Figure 4:
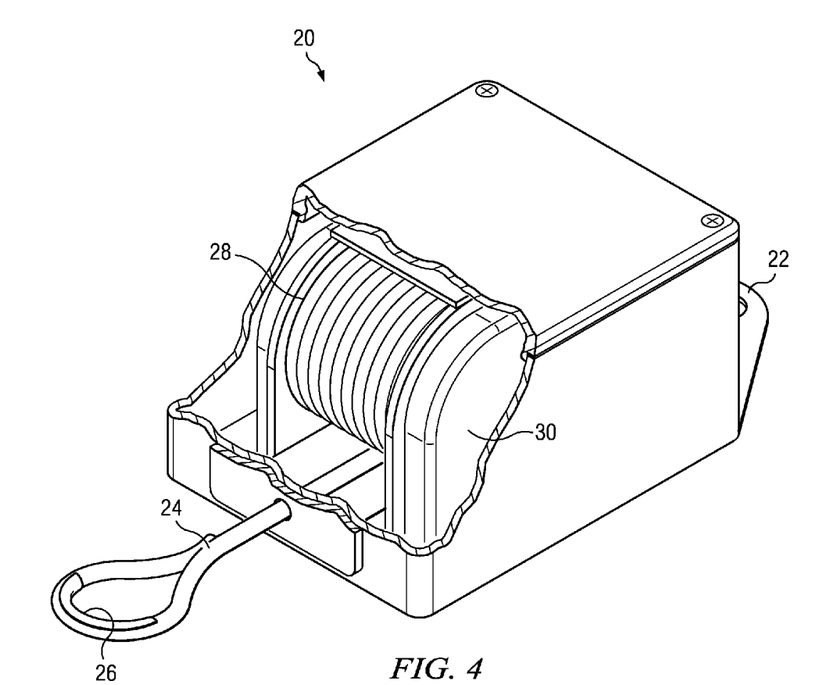
FIG. 4 shows an enlarged cut-away view of the restraining device with a retractable cord in accordance with an alternate second embodiment of the present invention.

Alternatively, any other type of retractable flexible member may be utilized instead of retractable belt 24. For instance, without limitation, the retractable cord, shown in FIG. 4, a rope, mesh, wire, band and the like may be utilized within the scope of the present invention.

Seat belt locking mechanisms are well-known in the automotive industry. Most seat belt locking mechanisms used in the automotive industry are stowed on spring-loaded reels called retractors equipped with inertial locking mechanisms that stop the belt from extending off the reel during severe deceleration.

One type of seat belt locking mechanism used in the automobile industry is known as a vehicle-sensitive lock. A vehicle-sensitive lock is based on a pendulum swung away from its plumb position by rapid deceleration or rollover of the vehicle. In the absence of rapid deceleration or rollover, the reel spool is unlocked and the seat belt strap may be pulled from the reel spool against the spring tension of the reel. The vehicle occupant can move around with relative freedom while the spring tension of the reel keeps the belt taut against the occupant. When the pendulum swings away from its normal plumb position due to sudden deceleration or rollover, a pawl is engaged, the reel locks and the strap restrains the belted occupant in position.

Another type of belt locking mechanism is known as a webbing-sensitive lock. A webbing-sensitive lock is based on a centrifugal clutch activated by rapid acceleration of the webbing from the reel spool. The belt can be pulled from the reel only slowly and gradually, as when the seat belt is slowly extended to fasten. A sudden rapid pull of the belt causes the reel spool to lock, restraining the belt in its current position.

U.S. Pat. No. 6,213,510, incorporated herein, teaches an arrangement in which a belt runs through a restraining device which mechanically actuates an energy-absorbing device for clamping a belt. The energy-absorbing device includes a plastically deformable plastic strip, allowing the belt to unwind in a controlled manner before being stopped completely. However, the energy-absorbing device described in U.S. Pat. No. 6,213,510 along with similar energy-absorbing devices are designed and configured to restrain an occupant in a vehicle during a collision. U.S. Pat. No. 5,788,281, incorporated herein, teaches a seat belt locking mechanism having a lock ring with a predetermined number of internal teeth and rotatably mounted on a reel shaft, and a carrier. The lock ring is provided with a cam hole through which a cam of a pawl is inserted. The carrier is usually kept at a non-engaging position free from the internal teeth due to a spring force of a spiral spring, and moves to an engaging position in which the internal teeth stops when the carrier shifts relative to the lock ring. U.S. Pat. No. 4,167,254, incorporated herein, teaches another seat belt locking mechanism. U.S. Pat. No. 5,931,401, incorporated herein, teaches a webbing-sensitive belt locking mechanism. Manufactures of webbing-sensitive belt locking mechanisms include, without limitation: All Island Webbing & Trim, LLC, 258 Broadway, Unit C, Huntington, N.Y. 11746; Ningbo Linkai Auto Part Co., Ltd., Panhuo village, Yinzhou district, Ningbo, Zhejiang, China; and Seatbelt Planet.

According to at least one embodiment, a distinction between the energy-absorbing portion 30 of the present invention and a typical seat belt locking mechanism used in the automotive industry (e.g., the vehicle-sensitive lock) is that a typical seat heft locking mechanism is arranged to operate in a limited degree range in order to lock in an automobile rollover event whereas the energy-absorbing portion 30 of the present invention preferably is arranged to operate in 360 degrees.

Figure 5A:
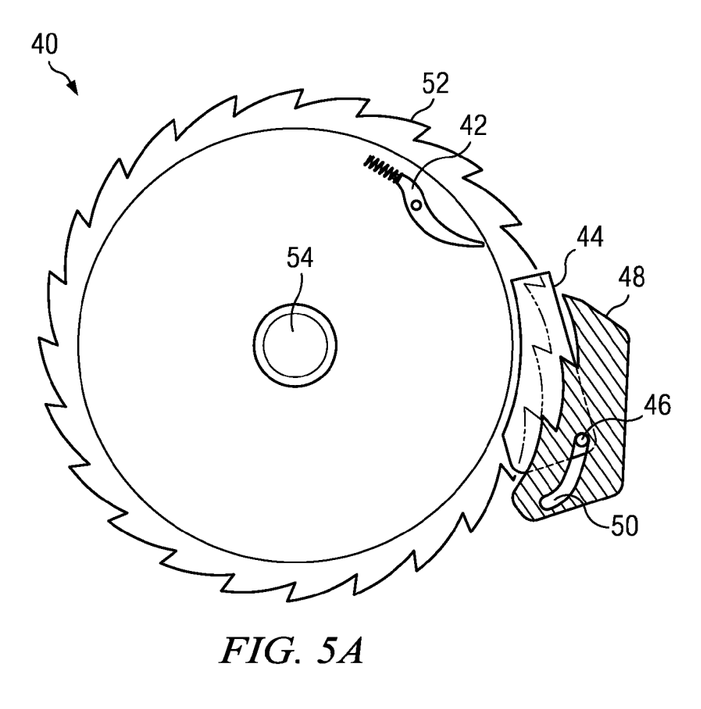
FIG. 5A shows an energy-absorbing element in a non-energy-absorbing position in accordance with the first embodiment of the present invention.
Figure 5B:
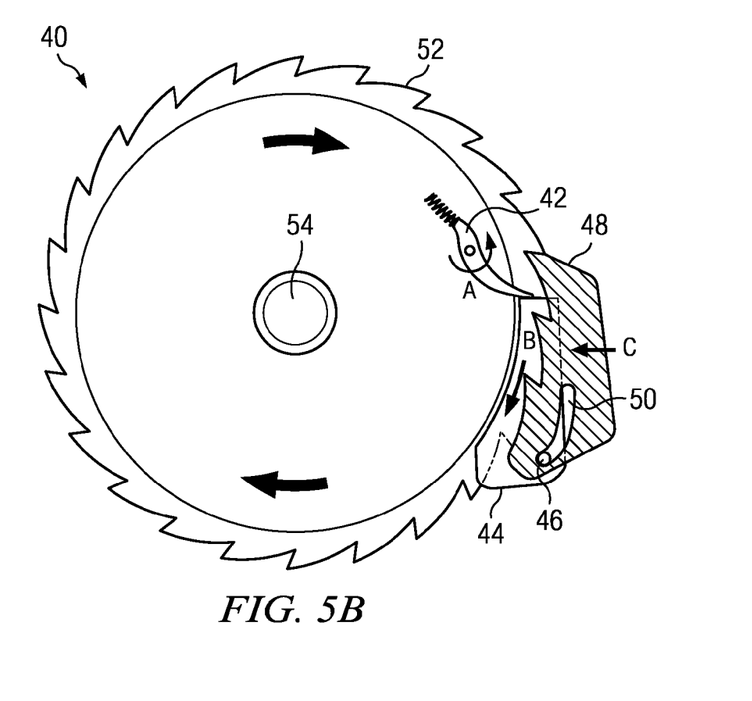
FIG. 5B shows an energy-absorbing element in an energy-absorbing position in accordance with the first embodiment of the present invention.

Referring to FIGS. 5A and 5B, an energy-absorbing element in respectively a non-energy-absorbing position and an energy-absorbing position in accordance with an embodiment of the present invention is shown. The energy-absorbing element 40 is operatively connected to belt spool 28 and is adapted to cooperate with the retractable belt 24 to absorb energy and temporarily lock the retractable belt 24 in its current position upon the occurrence of a sudden or unexpected wind gust which results in a sudden centrifugal force retractable belt 24. The sudden centrifugal force causes pivot piece 42 to pivot outward where it contacts cam piece 44. Pin 46 travels through slot 50 in pawl in engaging piece 48 causing it to engage teeth 52 in ratchet ring. Alternatively, energy-absorbing element 40 may include any type of now known or unknown arrangement within the scope of the present invention. The energy-absorbing element may include, without limitation, any type of clamp or pinching device and may or may not have engaging teeth. For instance, a deformable plastic as taught by U.S. Pat. No. 6,213,510 may be utilized within the scope of the present invention.

Figure 6:
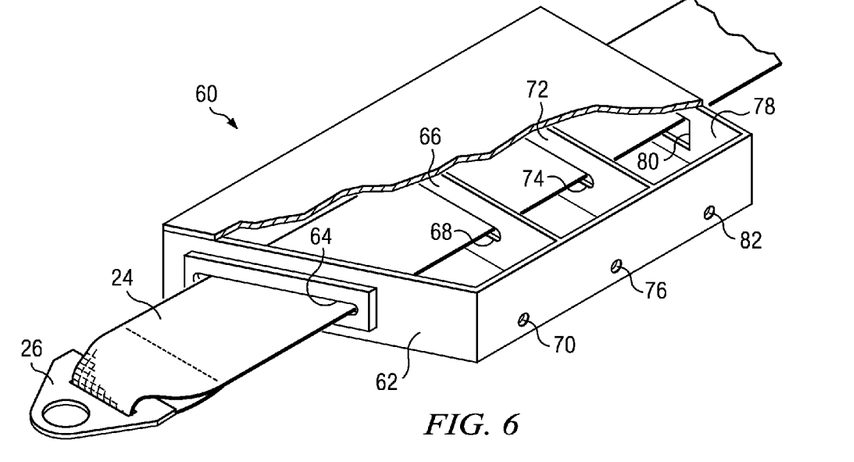
FIG. 6 shows an enlarged cut-away view of a water shield attachment in accordance with an optional third embodiment of the present invention.

Referring to FIG. 6, an enlarged cut-away view of a water shield attachment 60 in accordance with an embodiment of the present invention is shown. Water shield attachment 60 includes rear portion 78 and angled front portion 62. Contained within the water shield attachment 60 are one or more optional baffles 66 and 72. Openings 64, 68, 74 and 80 are configured to accept retractable belt 24 there through. Openings 70, 76 and 82 are operatively arranged along a bottom portion of the water shield attachment 60 to allow water and/or other fluids to drain from the interior of the water shield attachment 60. Opening 80 is configured to be operatively connected to the restraining device 20. The water shield attachment 60 may be connected to the restraining device 20 by any now known or unknown means, such as, without limitation, by means of a bolt, screw, nail, dowel, divot, hook, wire, cord, Velcro and the like, within the scope of the present invention. The water shield attachment 60 may also be welded, glued or otherwise permanently connected to restraining device 20, or may be integrated into restraining device 20.

In operation, angled front portion 62 is angled to shield opening 64 from rain water or other downward directed fluids. Optional baffles 66 and 72 and rear portion 78 are each arranged to redirect any water entering the water shield attachment downwards toward openings 70, 76 and 82 in order to drain the water out of the water shield attachment.

In operation, an exterior housing of the retaining device 20 is attached to a portion of a recreational camper 10 having one or more movable portions (12 and 14) that may be affected by a force caused by a wind condition while traversing from a compacted position to an expanded position or vise-versa. A reeled retractable belt 24 is wound or unwound longitudinally from a belt spool 28 within a predetermined range of movement defined substantially by the compacted position and the expanded position of the moveable portions (12 and 14). Such winding or unwinding occurring white the recreational camper 10 is being compacted or extended, respectively. The retractable belt 24 is temporarily locked in a fixed position when a predetermined force on the reeled retractable belt 24 is exceeded by a wind condition via an energy-absorbing element that is adapted to cooperate with the retractable belt 24 to absorb energy and temporarily lock the retractable belt 24 in the fixed position.

While the present invention has been described with reference to one or more particular embodiments, those skilled in the art will recognize that many changes may be made thereto without departing from the spirit and scope of the present invention. Each of these embodiments and obvious variations thereof is contemplated as filling within the spirit and scope of the claimed invention, which is set forth in the following claims.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. A recreational camper wind restraint system, comprising:
   a housing;
   a recreational camper having a movable portion, wherein the housing is connected to a portion of a recreational camper, the movable portion has a compacted position and an expanded position, and wherein the position of the movable portion may be affected by a force caused by a wind condition;

a retractable belt having a first end rotatably contained within the housing and a second end operatively connected to the moveable portion;

a winding means contained within the housing for operatively winding and unwinding the retractable belt longitudinally within a predetermined range of movement defined substantially by the compacted position and the expanded position of the moveable portion; and an energy-absorbing element adapted to cooperate with the retractable belt to absorb energy and temporarily lock the retractable belt in a fixed position when a predetermined force is exceeded by a wind condition.

2. The system of claim 1 wherein the recreational camper comprises an A-Frame camper.

3. The system of claim 1, wherein the recreational camper comprises a recreational vehicle or trailer.

4. The system of claim 1, wherein the energy-absorbing element is configured to operate in 360 degrees.

5. The system of claim 4, wherein the energy-absorbing element incorporates an webbing-sensitive belt locking mechanism.

6. The system of claim 1, further comprising a means for unlocking the retractable belt in an unfixed position when the predetermined force is no longer exceeded by the wind condition.

7. The system of claim 1, wherein the housing comprises an exterior housing is configured to provide weather protection to the winding means, the energy-absorbing element and at least a portion of the retractable belt.

8. The system of claim 1, wherein the energy-absorbing element comprises a pivoting clamping element in alignment with the retractable belt and operatively configured to clamp the retractable belt.

9. The system of claim 1, wherein the housing includes an exterior water shield arranged to redirect rain water from reaching an interior portion of the housing.

* * * * *